Dec. 31, 1963  G. D. FIOCCO  3,116,483
RADAR SYSTEMS
Filed April 29, 1960
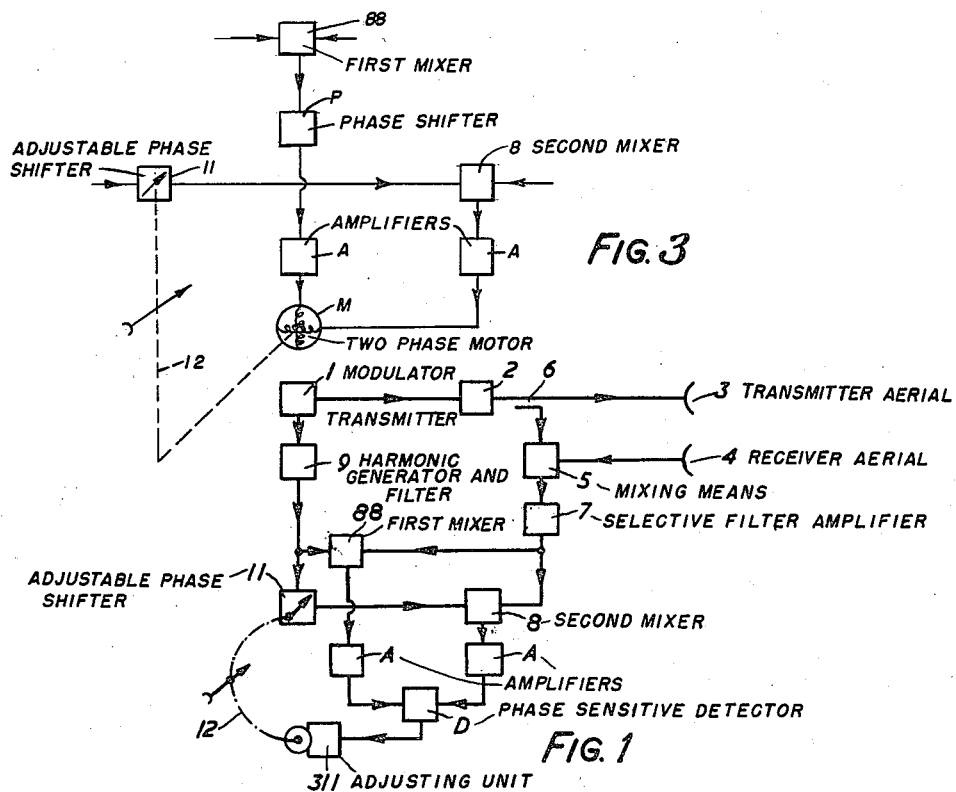
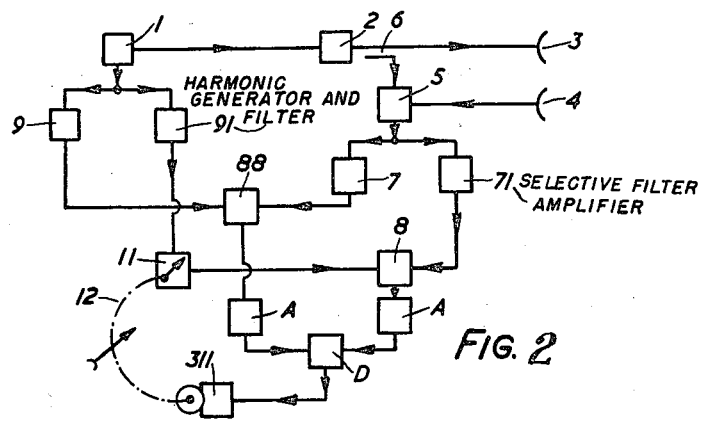
INVENTOR
Giorgio Domenico Fiocco
BY Baldwin & Wight
ATTORNEYS United States Patent Office 3,116,483
Patented Dec. 31, 1963

3,116,483
RADAR SYSTEMS
Giorgio Domenico Fiocco, Chelmsford, England, assignor to The Marconi Company Limited
Filed Apr. 29, 1960, Ser. No. 25,621
Claims priority, application Great Britain Oct. 5, 1959
9 Claims. (Cl. 343—14)

This invention, which is for improvements in or modifications of the invention contained in the specification of the co-pending parent patent application No. 852,287, relates to radar systems, a term which is used in this specification, as in the parent specification, to include radio altimeters since these can be regarded as radar systems in which the transmitted radio beam is projected downwards to a reflecting target constituted by the earth's surface. More specifically the invention relates to frequency modulated continuous wave (C.W.) radar systems wherein a frequency modulated transmitted wave, received after reflection from a target, is mixed with energy from the frequency modulated transmitter, and a desired selected frequency band resulting from such mixing is detected by beating with a corresponding frequency derived from the modulation source. The detected resultant, which will include Doppler shift frequencies due to motion of targets, may be employed to indicate the velocity of a reflecting target. The object of the parent invention is to provide improved and simple means, whereby, in a radar system of this kind, the range of a target can be ascertained.

According to the parent invention a range measuring frequency modulated C.W. radar system comprises a transmitter adapted to transmit a high frequency radio wave frequency modulated by at least one predetermined modulating frequency; means for mixing received deflected transmitted energy with energy taken from said transmitter; means for selecting from the output of said mixing means a predetermined band of frequencies including a predetermined selected harmonic of said modulating frequency; means for deriving from the predetermined modulating frequency the same predetermined harmonic of said frequency; and means for utilising the phase relation between said derived harmonic and said selected harmonic for determining the range of a reflecting target. It is to be understood that in this specification the use of the term "harmonic," embraces the fundamental frequency (the first harmonic).

It is not necessary, though it will generally be preferred, to select from the output of the aforesaid mixing means a predetermined band of frequencies including a predetermined selected harmonic of the modulating frequency, nor is it necessary to derive the same harmonic from the modulating frequency, for, instead of doing this, it is possible to select from the output of the said mixing means a predetermined band of frequencies including the modulating frequency itself and to determine range by utilising the phase relation between the modulating frequency in the selected band and the modulating frequency from the source thereof. According to a feature of this invention, therefore, a range measuring frequency modulated C.W. radar system comprises a transmitter adapted to transmit a high frequency radio wave frequency modulated by at least one predetermined modulating frequency; means for mixing received reflected transmitted energy with energy taken from said transmitter; means for selecting from the output of said mixing means a predetermined band of frequencies including said modulating frequency; and means for utilising the phase relation between the modulating frequency in said selected band and the modulating frequency from the source thereof for determining the range of a reflecting target.

In one arrangement in accordance with the parent invention the output from the means for mixing received energy from the transmitter means, and output from the means for deriving a harmonic from the modulating frequency are fed through channels, one of which includes a variable phase shifter to a mixer the output from which is fed to a strength measuring device whereby the range can be ascertained by manually adjusting the phase shifter until the mixer output is substantially zero and noting the adjustment. In some modifications in accordance with the parent invention, however, purely automatic reading of range is given, without the necessity of manually adjusting the phase shifter and in one embodiment of this nature described in the parent specification the strength measuring device responsive to input signal strength fed thereto is arranged automatically to adjust the phase shifter until the said input signal strength is brought substantially to zero, the range being indicated by the position to which the phase shifter is automatically adjusted. A defect of this embodiment is that the measurement of range given thereby is not as precise, definite and accurate as is desired for the measurement depends for its accuracy on determination by amplitude measurement as to whether or not the input signal strength is brought to zero and to make such determination with the required precision is extremely difficult. The object of an important feature of this invention is to avoid this defect and to provide automatic range measurement which does not, in the last analysis, depend on an amplitude measurement and is of improved precision and accuracy.

According to another feature of this invention a range measuring frequency modulated C.W. radar system comprises a transmitter adapted to transmit a high frequency radio wave frequency modulated by at least one predetermined modulating frequency; means for mixing received reflected transmitted energy with energy taken from said transmitter; means for selecting from the output of said mixing means a predetermined band of frequencies including said modulating frequency or a predetermined selected harmonic thereof; a first mixer connected to mix said selected band with modulating frequency from the source thereof or, if said selected band is a harmonic-containing band, with the corresponding harmonic of the modulating frequency from the source; a second mixer connected to receive two inputs, one consisting of a selected band from the output of said mixing means and containing the modulating frequency or a predetermined harmonic thereof and the other consisting of the modulating frequency from the source thereof or, if the last mentioned selected band is a harmonic-containing band, the same harmonic of the modulating frequency from said source; means for introducing a variable relative phase shift between the two inputs to the second mixer; and means responsive to relative phase change between the outputs from the first and second mixers for automatically adjusting the relative phase between the two inputs to the second mixer so as to maintain a predetermined phase relation between the said mixer outputs, the range being indicated by the position of adjustment thus automatically achieved.

The two inputs fed to the first mixer and the two inputs fed to the second mixer may all be of the same frequency but this is not necessary and it is possible to carry out the last mentioned feature of this invention by choosing one harmonic for the inputs to one mixer and another for the inputs to the other or by choosing the modulating frequency for the inputs to one of the two mixers and a harmonic for the inputs to the other.

The advantage, from the point of view of accuracy of range measurement, arises from the fact that the phase of the output from the second mixer changes rapidly through 180° when the amplitude of that output passes through the zero point and it is this change which is utilised to secure the necessary automatic adjustment, in one direction or the other, as may be required, of the relative phase between the two inputs to said second mixer. This automatic adjustment can be obtained in various different ways, e.g. one of the two mixer outputs may be phase shifted through 90° and fed to one phase winding of a two-phase motor, the other phase of which is fed with output from the other of the two mixers, the motor serving to adjust a variable phase shifter in one of the two input channels to the second mixer—preferably the channel through which the modulating frequency (or a harmonic thereof) is fed to said second mixer. However, in a preferred arrangement the outputs of the two mixers are fed to a phase sensitive detector adapted to provide a direct current output the polarity of which will reverse when the phase of the output from the second mixer changes through 180°, and this direct current output is used, after such amplification as may be desired, to control the energisation and direction of running of an electric motor serving to adjust a variable phase shifter.

The invention is illustrated in the accompanying drawings in which FIG. 1 is a diagram of an embodiment of this invention, FIG. 2 is a diagram of another embodiment of this invention, and FIGURE 3 is a diagram showing a control mechanism alternative to that of FIGURES 1 and 2.

Referring now to the same parts as in FIGURE 1, a desired one (the Nth) of the harmonic frequency bands in the output from the mixer 5 is selected by a harmonic selecting filter amplifier 7 and the same harmonic (the Nth) of the modulating frequency from the source 1 is also selected by a harmonic generator and filter 9 fed therefrom. The outputs from units 9 and 7 are directly fed as the two inputs to a mixer 88. Output from unit 9 is also fed, after being shifted in phase by the adjustable phase shifter 11 to a mixer 8 whose second input is taken directly from unit 7. The outputs from mixers 8 and 88, after amplification by amplifiers A, are fed to a phase sensitive detector D whose output controls an adjusting unit 311 including a motor which adjusts the phase shifter 11 and drives the range indicating pointer. It will be seen that, if the phase adjuster 11 is changed in adjustment so as to cause the output amplitude from mixer 8 to pass through zero value, the phase of the output from said mixer 8 will change through 180° as this passage occurs. The phase-sensitive detector D is of any convenient known kind adapted to produce a direct current output whose polarity reverses when such phase reversal occurs. This direct current output is employed in any convenient known manner to actuate the unit 311 in such manner as to cause the motor thereof automatically to adjust the phase adjuster 11 to maintain the output from mixer 8 as closely as possible to the point at which the aforesaid phase reversal occurs. The units D and 311 could obviously be replaced by a two-phase motor having one phase winding fed directly with output from one of the mixers 8 and 88 and the other fed with output from the other of these mixers after phase shifting through 90°. Such an arrangement is indicated in FIGURE 3. The two phase motor is indicated at M and the 90° phase shifter at P.

In FIGURE 1 the inputs to the mixers 8 and 88 are shown as being harmonic inputs, all of the same harmonic. This is not essential for the inputs could all be fundamental modulating frequency inputs or again, one mixer could receive fundamental frequency inputs and the other inputs of a selected harmonic, or, again, the inputs to one mixer could be of one selected harmonic while those to the other were of a different selected harmonic. FIGURE 2 illustrates the last of these three possibilities. In FIGURE 2 units 9 and 7 select one harmonic (say, the second) for feeding to the mixer 38 while units 91 and 71 (fed in parallel with units 9 and 7 respectively) select a different harmonic (say the third) for feeding to mixer 8. In other respects FIGURE 2 is the same as FIGURE 1 and requires no further description.

I claim:

1. A range measuring frequency modulated C.W. radar system comprising a transmitter adapted to transmit a high frequency radio wave, a source of at least one modulating frequency, means for frequency modulating said high frequency radio wave with energy from said source, means for mixing received reflected transmitted energy with energy taken from said transmitter, means for selecting from the output of said mixing means a predetermined band of frequencies including a predetermined selected harmonic of the modulating frequency, a first mixer connected to mix the selected band with the corresponding harmonic of the modulating frequency from the source, a second mixer connected to receive two inputs, one consisting of a selected band from the output of said mixing means and containing a predetermined harmonic of the modulating frequency and the other consisting of the corresponding harmonic of the modulating frequency from said source, adjustable phase shifting means connected to adjust the phase relation between the inputs to said second mixer, means responsive to relative phase change between the outputs from said first and second mixers for automatically adjusting said phase shifting means thereby maintaining a predetermined phase relation between said mixer outputs and means for indicating range in accordance with the adjustment of said phase shifting means.

2. A C.W. radar system as claimed in claim 1 wherein the two inputs fed to the first mixer and the two inputs fed to the second mixer are all of the same frequency.

3. A C.W. radar system as claimed in claim 1 wherein one harmonic is used for the inputs to one mixer and another harmonic is used for the inputs to the other 4. A C.W. radar system as claimed in claim 1 wherein automatic adjustment of the relative phase between the two inputs to the second mixer is obtained by shifting the phase of one of the two mixer outputs through 90° and feeding the phase shifted resultant to one phase winding of a two phase motor the other phase of which is fed with output from the other of the two mixers, the motor serving to adjust a variable phase shifter in one of the two input channels to the second mixer.

5. A C.W. radar system as claimed in claim 1 wherein automatic adjustment of the relative phase between the two inputs to the second mixer is obtained by feeding the outputs of the two mixers to a phase sensitive detector adapted to provide a direct current output the polarity of which will reverse when the phase of the output from the second mixer changes through 180° and utilising the said direct current output to control the energisation and direction of running of an electric motor serving to adjust a variable phase shifter in one of the two input channels to the second mixer.

6. A C.W. radar system as claimed in claim 4 wherein the motor adjusted phase shifter is in the channel through which the harmonic of the modulating frequency is fed to the second mixer.

7. A C.W. radar system as claimed in claim 3 wherein automatic adjustment of the relative phase between the two inputs to the second mixer is obtained by shifting the phase of one of the two mixer outputs through 90° and feeding the phase shifted resultant to one phase winding of a two phase motor the other phase of which is fed with output from the other of the two mixers, the motor serving to adjust a variable phase shifter in one of the two input channels to the second mixer.

8. A C.W. radar system as claimed in claim 3 wherein automatic adjustment of the relative phase between the two inputs to the second mixer is obtained by feeding the outputs of the two mixers to a phase sensitive detector adapted to provide a direct current output the polarity of which will reverse when the phase of the output from the second mixer changes through 180° and utilizing the said direct current output to control the energization and direction of running of an electric motor serving to adjust a variable phase shifter in one of the two input channels to the second mixer.

9. A C.W. radar system as claimed in claim 3, wherein the motor adjusted phase shifter is in the channel through which one of the harmonics (of which the fundamental is one) of the modulating frequency is fed to the second mixer.

References Cited in the file of this patent

UNITED STATES PATENTS

| | | |
|---|---|---|
| 2,769,158 | Schultz | Oct. 30, 1956 |
| 2,935,743 | Glegg | May 3, 1960 |
| 2,958,862 | Rey | Nov. 1, 1960 |